United States Patent [19]
Klose

[11] Patent Number: 5,508,490
[45] Date of Patent: Apr. 16, 1996

[54] LASER MACHINING HEAD AND AUXILIARY EQUIPMENT FOR A NUMERICALLY CONTROLLED MACHINE TOOL

[75] Inventor: Jürgen Klose, Roetgen, Germany

[73] Assignee: Aclas Lasertechnik & Maschinenbau GmbH, Aachen, Germany

[21] Appl. No.: 136,510

[22] Filed: Oct. 14, 1993

[30] Foreign Application Priority Data

Oct. 22, 1992 [DE] Germany ............... 42 35 592.3

[51] Int. Cl.$^6$ ............................................. B23K 26/00
[52] U.S. Cl. ................. 219/121.62; 219/121.6; 219/121.67
[58] Field of Search ............ 219/121.39, 121.48, 219/121.6, 121.61, 121.62, 121.67, 121.78, 121.83, 121.72, 121.73, 121.79, 121.75; 372/701; 266/77, 78, 160; 29/50, 52, 54, 560, 566, 650; 483/16

[56] References Cited

U.S. PATENT DOCUMENTS

| 4,665,607 | 5/1987 | Ressencourt | 219/121.67 |
| 4,698,480 | 10/1987 | Klingel | 219/121.67 |
| 4,855,565 | 8/1989 | Thomas et al. | 219/121.79 |
| 5,122,635 | 6/1992 | Knödler et al. | 219/121.78 |
| 5,298,716 | 3/1994 | Ogawa et al. | 219/121.67 |
| 5,332,881 | 7/1994 | Topkaya et al. | 219/121.78 |

FOREIGN PATENT DOCUMENTS

| 0158866 | 6/1989 | European Pat. Off. . | |
| 3814074 | 11/1989 | Germany | 219/121.67 |
| 5-6168918 | 12/1981 | Japan . | |
| 63-104794 | 3/1988 | Japan | 219/121.61 |
| 1-321089 | 12/1989 | Japan | 219/121.73 |
| 2-224887 | 9/1990 | Japan | 219/121.6 |
| 3-165983 | 7/1991 | Japan . | |
| 4-111989 | 4/1992 | Japan | 219/121.6 |
| 4-197589 | 7/1992 | Japan . | |
| WO9216314 | 3/1992 | WIPO . | |

Primary Examiner—Teresa J. Walberg
Assistant Examiner—Gregory L. Mills
Attorney, Agent, or Firm—Meltzer, Lippe, Goldstein

[57] ABSTRACT

A laser machining head for a numerically controlled machine tool having a tool holder for coupling with a mechanical machining head is disclosed. The laser machining head comprises a first element comprising a tool shaft, the tool shaft being configured for coaxially coupling the laser machining head to the tool head, and a second element containing laser optics. The second element is movably connected to the first element so that the position of the second element relative to the first element is adjustable.

15 Claims, 2 Drawing Sheets

LASER MACHINING HEAD AND AUXILIARY EQUIPMENT FOR A NUMERICALLY CONTROLLED MACHINE TOOL

BACKGROUND OF THE INVENTION

The invention relates to a laser machining head for a numerically controlled machine tool. The laser machining head includes a tool shaft capable of being coupled to the tool holder of the numerically controlled machine tool which is intended to receive the tool shaft of a mechanical machining tool. The tool shaft allows for the coaxial arrangement of the laser head in relation to the axis of the mechanical machining tool so that interchangeability with a mechanical machining tool is possible. The invention furthermore relates to auxiliary equipment for a numerically controlled machine tool with such a laser machining tool capable of being coupled to the tool holder of the machine tool.

A numerically controlled machine tool for selective machining of a production piece either by means of a mechanical machining tool or by means of a laser cutting device is known from EP 0158866 B1. In this known machine tool the mechanical machining tool, e.g., a punch tool, and the laser machining head are each equipped with the same type of shaft by means of which they can be inserted in the tool seat of the machine tool. When the laser machining head has been inserted into the tool seat, the geometrical axis of the laser head is identical with the geometrical axis of the mechanical machining tool. Consequently the same program can be used in such a machine for either the mechanical or the laser machining head.

In this known machine tool the replaceable laser machining head is a rigid device. It consists of a cylindrical hollow body and includes a nozzle directed upon the production piece and a lens setting with a lens through which the laser rays are focused on the production piece. The laser rays are deflected in the axial direction via a deflection mirror located outside the laser head and are directed through the hollow body upon the lens.

Furthermore, a device of the type mentioned initially in which the laser beam of the laser is transmitted by means of a light-conducting cable to the laser machining head is known from (JP 3-165983 A, Patents Abstracts of Japan, 1991, Vol. 15/No. 404, Sec. M-1168.

It is the object of the present invention to develop a machine tool of the type mentioned initially so that possible shifts of the geometric axis of the laser beam and/or angular deflections of the laser beam which are inevitable in the optical system of such a machine because of maladjustments in the mechanical and in the optical systems, may be corrected with relative ease.

SUMMARY OF THE INVENTION

According to the invention, this object is attained in that the laser machining head comprises an element containing the tool shaft and an element containing the laser optics, their positions in space with respect to each other being adjustable.

It is thus possible to easily make adjustments which may be necessary on the laser head itself by means of the laser machining head designed according to the invention without any action to be carried out on the machine tool itself. Since the laser head is easily accessible as a rule, such adjustments can be carried out without great expenditure of effort and relatively rapidly.

The tool shaft by means of which the laser machining head is inserted into the tool seat, i.e., into the coupling element in the tool holder, can be a tool shaft with the standard dimensions of a tool shaft of a mechanical cutting tool, so that the laser machining head according to the invention can be mounted in a standard tool holder of a machine tool.

In a further development of the invention, the element containing the tool shaft and the element containing the laser optics of the laser machining head are advantageously connected to each other via a pendulum bearing, whereby the angular positions of the two elements in relation to each other can be adjusted by means of adjusting screws.

When the two elements of the laser machining head are connected to each other via a pendulum bearing, the bearing shell of the pendulum bearing located in the element with the tool shaft can be adjusted advantageously by means of adjusting screws perpendicularly to the axial direction of the tool holder of the machine tool.

Another advantageous embodiment of the invention consists in transmitting the laser beams from a stationary laser to the laser machining head via a light-conducting cable which is connected laterally to the laser machining head at a right angle to the direction of the laser beam issuing from the laser machining head. An optical system is provided in the laser machining head which deflects the laser beam in the axial direction of the tool holder.

The invention can also be implemented by providing a retrofitting kit for a numerically controlled machine tool, comprising a laser machining head equipped with a tool shaft which can be coupled to the tool holder of the machine tool, a laser connected to the laser machining head via a light-conducting cable, a tool box holding the laser machining head in ready position, and a control circuit to actuate the laser and the machine tool. The laser machining head comprises an element containing the tool shaft and an element containing the laser optics, their positions in space in relation to each other being adjustable. The laser machining head is provided with a control switch to control mounting and a position sensor to recognize the mounting position, the control switch and/or the position sensor actuating a safety circuit which is part of the control circuit to switch on the laser.

With such a retrofitting kit, practically any machine tool equipped for purely mechanical machining of a production piece can be retrofitted into a laser machining machine at extraordinarily low cost and in a very brief time. By replacing the laser machining head by a mechanical machining tool, the machine can again be transformed rapidly into a mechanical machining machine.

BRIEF DESCRIPTION OF THE DRAWINGS

Additional advantageous developments of the invention will be ascertained from the description below and from the drawings of a preferred embodiment, wherein.

DETAILED DESCRIPTION OF A PREFERRED EMBODIMENT

Figure 1:
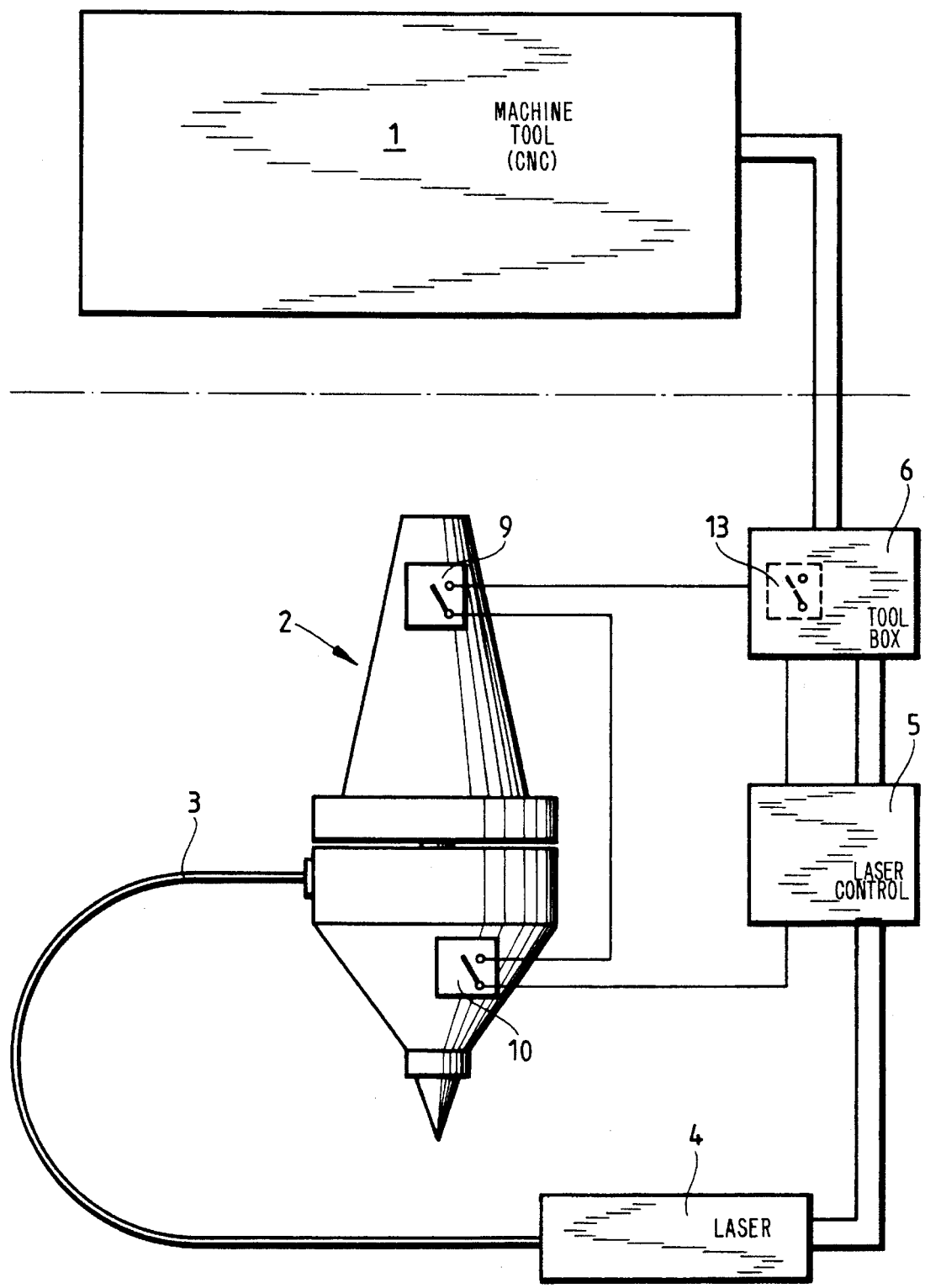
FIG. 1 shows a schematic overall representation of auxiliary equipment according to the invention for retrofitting a numerically controlled machine tool.

In the schematic representation of FIG. 1, the machine tool 1 is, for example, a numerically controlled milling machine wherein a compound slide rest is provided with a tool holder equipped with a tool spindle located in the tool holder and concentric with it which is driven by an electric motor. The tool spindle is coupled to the rotating milling tool as soon as the milling tool is mounted in the tool holder. Instead of this arrangement, it is also possible to use the rotatable tool spindle itself directly as the tool holder. The machine tool 1 could also be a numerically controlled lathe in which the tool is mounted on a compound slide rest and is moved along side and at a right angle to the axis of rotation of the mounted production piece which is being rotated.

In a CNC-controlled milling machine for which the invention is described in greater detail below, the X-Y path control of the compound slide rest as well as the actuation of the drive motor of the tool spindle and the actuation of the other drive motors, e.g. the drive motor of the coolant for mechanical milling and of the drive motor of the ventilator supplying operating gas for the use of the laser machining head, are effected by means of numerical control which is integrated into the machine tool 1 according to the schematic representation.

The tool holder of the milling machine is provided with a standard mounting coupling, e.g., for an SK40 steep angle taper. This is preferably for a conventional machine used for the cutting/machining of production pieces and which is commercially available.

Instead of a conventional cutting machining tool, a laser machining head 2 equipped with a tool shaft corresponding to the coupling element of the tool holder may be mounted in the tool holder of the machine tool 1. A flexible light-conducting cable 3 through which the laser rays produced in the laser 4 are transmitted to the laser machining head 2 is connected to the laser machining head 2. This laser 4 can be installed permanently at an appropriate location on the machine tool 1.

To ensure proper operation of the machine and to eliminate possible sources of danger, a safety arrangement comprising a tool box 6 which is connected to the laser controls 5 is provided in addition to the laser machining head 2, the laser 4 and the laser controls 5. The tool box 6 serves to contain the laser machining head 2 when it is not in use and is not mounted on the tool holder. For this purpose the tool boy is provided at its top with a depression (not shown) adapted to the laser machining head 2 in which the laser machining head 2 is placed when not in use. One or several safety switches 13 are installed in the tool box 6 and are actuated by the laser machining head 2 when it is in the tool box. The safety arrangement furthermore includes a control switch 9 located in the laser head 2. This control switch 9 recognizes whether the laser head 2 is mounted correctly in the tool holder. The safety arrangement furthermore comprises a position sensor 10 which is actuated only when the part of the laser head 2 from which the laser beam is emitted is precisely aligned in the desired operating position in which the operator and the surroundings of the machine are protected by appropriate safety measures.

The safety switch or switches 13 in the tool box, the control switch 9 in the part of the laser head 2 containing the tool shaft, and the position sensor 10 in the part of the laser head containing the laser optics are linked to each other in a safety circuit in such manner that the following safety criteria are met:

a) The laser 4 cannot be switched on for as long as the laser head 2 is still in the tool box 6;

b) the laser 4 can only be switched on when the control switch 9 in the laser head 2 is closed, i.e., when the laser head 2 is mounted in the machine tool;

c) the laser 4 can furthermore be switched on only when the contacts of the position sensor 10 in the laser head 2 are closed; and d) the drive motor of an operating spindle can be switched on only when the laser machining head 2 is in the tool box 6, in case the machine tool is one with a rotating operating spindle.

The safety circuit meeting these criteria ensures on the one hand that the operator of the machine and the operating environment are not endangered by the laser beam since the laser 4 cannot be switched on as long as the laser head 2 is not firmly mounted and the laser beam is not pointed in the desired direction, i.e., is not pointed exactly down in case of a milling machine. In addition, the operating spindle and thereby the laser head 2 is safely prevented from being rotated in its operating position.

The control signals coming from this safety circuit can also advantageously assume additional functions. These control signals, in addition to switching the laser and the drive motor of the operating spindle on and off, for instance, can also be used to switch the drive motor of the coolant pump on and off and to switch the drive motor of the gas pump which conveys the operating gas for the laser head on and off. In other words, these control signals coming from the safety circuit can also be used to switch over other devices of the machine tool, where their being switched over is necessary or desirable when the machine is switched over from mechanical operation to laser operation and vice versa.

Figure 2:
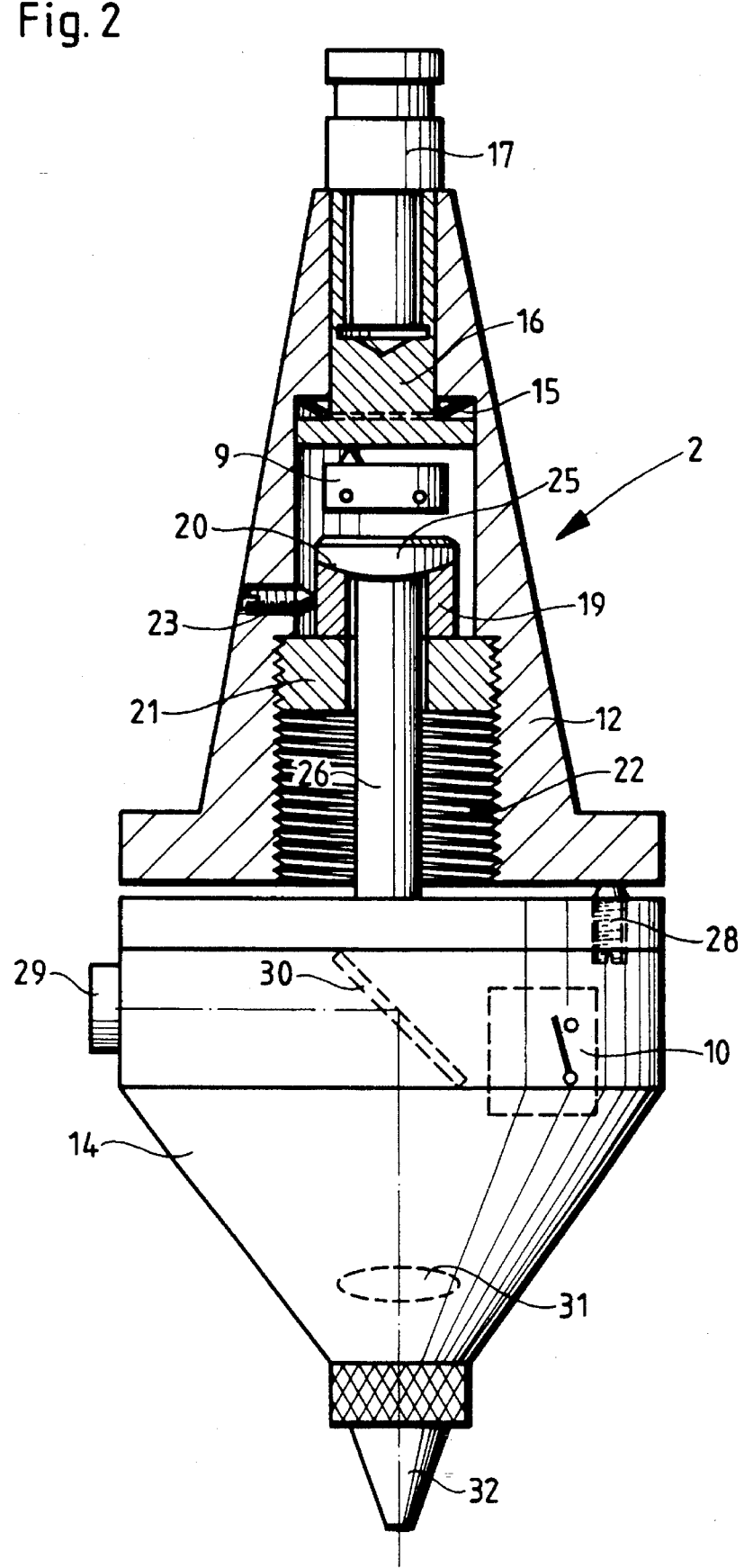
FIG. 2 shows the laser machining head according to the invention in partial section.

The construction of the inventive laser machining head 2 can be seen in FIG. 2. It comprises two elements which are connected to some extent movably to each other. An upper element comprises the actual tool shaft 12, while lower element 14 contains the laser optics. A slide 16 subjected to the force of a Belleville spring washer 15 and containing a mounting seat 17 with a ring-shaped mounting groove is installed inside the tool shaft 12. The control switch 9 which actuates the slide 16 when the tool shaft 12 is correctly mounted is located below the slide 16, inside the tool shaft 12.

A pendulum bearing supporting the lower element 14 with the laser optics is located inside the tool shaft 12. The pendulum bearing comprises a bearing shell 19 in the form of a hollow cylinder body, the upper bearing surface 20 of which is made in the form of a hollow ball. The bearing shell 19 rests on a disk 21 provided with outside threads which is screwed into a corresponding threaded bore in the tool shaft. The bearing shell 19 can be adjusted by means of three screws 23 (only one of which is shown) installed, e.g. radially in the tool shaft so that the laser beam emitted from the laser head is coaxial with the rotational axis of the spindle of the machine tool.

A bearing element 25 in the form of a universal ball joint to which a rod 26 is attached which is in turn attached to the lower element 14 with the laser optics rests upon the upper bearing surface 20 of the bearing shell 19. The lower element 14 of the laser head 2 is thus mounted in pendulum fashion in all directions. The angular position of the lower element 14, and thereby the precise alignment of the laser beam, can be adjusted for example by means of three screws 28 (only one of which is shown in FIG. 2). As can be seen in FIG. 2, the adjusting screws 23 adjust the horizontal position of the lower element 14 relative to the tool shaft 12, while the adjusting screws 28 adjust the vertical position of the lower element 14 relative to tool shaft 12.

The light-conducting cable 3 coming from the laser is connected laterally to the lower element 14 of the laser head.

A connection socket 29 into which the plug of the light-conducting cable 3 is inserted is provided for that purpose on the side of the lower element 14. The laser beams strike the deflection mirror 30 located in the lower element 14 and are deflected onto a lens or a lens system 31 focusing the laser beams. In the illustrated embodiment, the laser head is provided with a cutting nozzle 32 through which the laser beams on the one hand and an operating gas on the other hand emerge. For the sake of simplification the connection for the operating gas is not shown in the drawing. It is also possible to use a welding attachment for instance, instead of a cutting nozzle.

While the invention has been described by reference to specific embodiments, this was for purposes of illustration only and should not be construed to limit the scope of the invention. Numerous alternative embodiments will be apparent to those skilled in the art and are considered to be part of the invention.

I claim:

1. Laser machining head for a numerically controlled machine tool having a tool holder adapted for coupling with a mechanical machining head so as to define an axis, comprising a first element comprising a tool shaft, said tool shaft being configured for co-axially coupling said laser machining head to said tool holder, a second element containing laser optics, and means for movably connecting said second element to said first element so that the position of said second element is adjustable relative to said first element, wherein said means for movably connecting said second element to said first element comprises a pendulum bearing.

2. The laser machining head of claim 1 wherein said means for movably connecting said second element to said first element further comprises adjusting screws whereby the angular position of said first and second elements can be adjusted.

3. The laser machining head of claim 2 wherein said means for movably connecting said second element to said first element includes means for adjusting said second element in a direction which is perpendicular to said axis.

4. The laser machining head of claim 1 further comprising a control switch which is actuated when said tool shaft is coupled to said tool holder.

5. The laser machining head of claim 4 further comprising a position sensor in said second element which senses the position of said second element relative to said first element.

6. The laser machining head of claim 5 further comprising a control circuit for actuating a laser, said control switch and said position sensor forming a part of said control circuit.

7. The laser machining head of claim 6 wherein said laser is a stationary laser located outside of said laser machining head, and wherein said laser machining head further comprises a light conducting cable which transmits laser rays from said laser into said laser optics of said second element, said laser optics deflecting said laser rays along said axis.

8. Auxiliary equipment for a numerically controlled machine tool having a tool holder adapted for coupling with a mechanical machining head so as to define an axis, comprising a laser, a laser machining head, a light conducting cable which transmits laser rays from said laser to said laser machining head, a tool box adapted for holding said laser machining head when said laser machining head is not in use, a control circuit connected to said laser for actuating said laser and said machine tool, wherein said laser machining head comprises a first element comprising a tool shaft, said tool shaft being configured for coaxially coupling said laser machining head to said tool holder, a second element containing laser optics, and means for movably connecting said second element to said first element so that the position of said second element is adjustable relative to said first element, said laser machining head further including a control switch which is actuated when said tool shaft is coupled to said tool holder, and a position sensor which senses the position of said second element relative to said first element, said control switch and position sensor actuating a safety circuit constituting a part of the control circuit to switch on said laser.

9. The auxiliary equipment of claim 8 further comprising a switch in said tool box which senses the presence of said laser machining head and actuates said safety circuit to switch off said laser when said tool box holds said laser machining head.

10. The auxiliary equipment of claim 9 wherein said switch in said tool box, said control switch, and said position sensor are! i linked to each other in said safety circuit.

11. The auxiliary equipment of claim 10 wherein said switch in said tool box, said control switch, and said position sensor form a part of an additional control circuit by means of which drives for other devices connected to said numerically controlled machine are switched on and off when said machine is switched between mechanical operation and laser operation.

12. Laser machining head for a numerically controlled machine tool having a tool holder adapted for coupling with a mechanical machining head so as to define an axis, comprising a first element comprising a tool shaft, said tool shaft being configured for co-axially coupling said laser machining head to said tool holder, a second element containing laser optics, means for movably connecting said second element to said first element so that the position of said second element is adjustable relative to said first element, and a control switch which is actuated when said tool shaft is coupled to said tool holder.

13. The laser machining head of claim 12 further comprising a position sensor in said second element which senses the position of said second element relative to said first element.

14. The laser machining head of claim 13 further comprising a control circuit for actuating a laser, said control switch and said position sensor forming a part of said control circuit.

15. The laser machining head of claim 14 wherein said laser is a stationary laser located outside of said laser machining head, and wherein said laser machining head further comprises a light conducting cable which transmits laser rays from said laser into said laser optics of said second element, said laser optics deflecting said laser rays along said axis.

* * * * *